United States Patent [19]

Brown

[11] E Patent Number: Re. 31,702

[45] Reissued Date of Patent: Oct. 9, 1984

[54] TAB FOR EASY-OPEN ECOLOGY END

[75] Inventor: Omar L. Brown, Dayton, Ohio

[73] Assignee: Ermal C. Fraze, Dayton, Ohio

[21] Appl. No.: 201,357

[22] Filed: Oct. 27, 1980

Related U.S. Patent Documents

Reissue of:

[64] Patent No.: 4,148,410
Issued: Apr. 10, 1979
Appl. No.: 873,268
Filed: Jan. 30, 1978

[51] Int. Cl.[3] ..... B65D 41/32
[52] U.S. Cl. ..... 220/269
[58] Field of Search ..... 220/265-273

[56] References Cited

U.S. PATENT DOCUMENTS

| | | | |
|---|---|---|---|
| 3,977,561 | 8/1976 | Strobe et al. | 220/269 |
| 4,039,100 | 8/1977 | Wells | 220/269 |
| 4,150,765 | 4/1979 | Mazurek | 220/269 |

*Primary Examiner*—George T. Hall

[57] ABSTRACT

When the improved tab is lifted by its lifting end, its opening end ruptures a scored line defining a panel, and this opens the container. The tab is retained to the container by a flap extending from the opening end toward the lifting end and including an affixing portion which is riveted to the container. After the container has been opened, the lifting end of the tab is depressed toward the end of the container. In prior art tabs, flexing of the flap occurred at a first bending region adjacent the affixing portion during both the lifting and depressing motions. In contrast, in the present invention the flap is shaped to provide a second bending region adjacent the openind end, in addition to the first bending region adjacent the affixing portion. When the lifting end is lifted, the improved tab flexes in the first bending region, and when the lifting end is depressed, the improved tab flexes in the second bending region. In this manner the flexing is shared between the first and the second bending regions.

13 Claims, 17 Drawing Figures

TAB FOR EASY-OPEN ECOLOGY END

Matter enclosed in heavy brackets [ ] appears in the original patent but forms no part of this reissue specification; matter printed in italics indicates the additions made by reissue.

BACKGROUND OF THE INVENTION

B 1. FIELD OF THE INVENTION

The present invention relates to an easy-opening container and more specifically, to an improved retained tab affixed to the end wall of the container for opening it.

2. THE PRIOR ART

Easy-opening containers typically include a tap permanently joined to a tear strip, the latter being separable from the can top to provide an opening. Typically, the top is ruptured along a continuous score line and the tab and tear strip are removed as a unit and normally discarded.

The wide spread use of easy-opening containers has resulted in the littering of beach and picnic areas by an accumulation of discarded pull-tabs and tear strips. These discarded items are difficult to clean up because of their small size and because they are normally made of aluminum and therefore cannot be collected by magnetic means.

The can industry has responded to this ecological problem by developing a number of ingenious easy-opening containers in which the tab and tear strip are permanently retained to the can even after it has been opened. Typical cans of this type are are disclosed in: U.S. Pat. No. 4,030,631, issued June 1, 1977, to Brown; U.S. Pat. No. 4,024,981, issued May 24, 1977, to Brown; and U.S. Pat. No. 4,015,744 issued Apr. 5, 1977, to Brown.

Some states have ecology laws which forbid the use of a closure that separates from the can in the opening movement. The recently developed ecology cans disclosed in the above patents comply fully with such state laws. However, it has been found that the tabs can be broken off from the cans by successive flexing movements, and a few sightings of such broken-off tabs have been reported. In view of this continuing littering, some state regulatory agencies are imposing more stringent requirements upon the cans. To meet these requirements, it will be necessary for the tab to be retained to the can even after being subjected to a number of flexing cycles. Thus, an urgent need exists for an easy-open can having a tab which can withstand a number of flexing cycles without breaking off.

One approach to increasing the flexure endurance of the tabs is disclosed in columns 12 and 13 of U.S. Pat. No. 3,967,752, issued July 6, 1976, to Cudzik. Cudzik discloses a composite tab which includes an insert of a dead soft aluminum alloy. This insert, which has superior flexural endurance continues to retain the tab to the can even after the body of the tab, which is made of a stiff aluminum alloy, has failed due to flexural fatigue.

Because of its composite structure, the tab disclosed by Cudzik requires tooling for producing it which is substantially more expensive than the tooling required to produce the improved tab of the present invention.

The limited flexural endurance of the tabs disclosed in the patents issued to Brown referred to above is inherent in their structure. In those tabs, the repeated flexing is localized along a line adjacent the rivet by which the tab is affixed to the can end. Successive flexing cycles cause the material in this area of localized flexing to work harden, becoming brittle and breaking there. Except for its limited flexural endurance, the tab disclosed in the Brown patents referenced above is very attractive because of its unitary structure and relatively low cost of production.

Thus, it appears that an urgent need exists in the can industry for a retained tab having a unitary structure and capable of withstanding a number of flexing cycles.

SUMMARY OF THE INVENTION

It has been found that a minor but crucial improvement to the unitary tab can greatly increase the number of flexure cycles it can withstand while still remaining secured to the can end.

The improvement involves shaping the flap portion of the tab, which previously failed under repeated flexing, in such a way as to avoid localized bending of the material. In a preferred embodiment, a second bending region is produced so that the bending is distributed over a larger area. Accordingly, the angular deflection is reduced and the bending radius is increased, resulting in greater flexural endurance.

In a preferred embodiment, the width of the flap portion nearest the opening end of the tab is intentionally reduced to encourage bending in that region, thereby generating a second region of bending spaced from the normal region of bending adjacent the attaching portion of the tab.

When improved in this manner, the unitary tab disclosed in the above referenced patents to Brown fills the need for a unitary tab having increased flexural endurance and which is inexpensive to produce.

The novel features which are believed to characterize the invention both as to its structure and operation, together with further objects and advantages, will be better understood from the following description considered in connection with the accompanying drawings in which a preferred embodiment of the invention is illustrated by way of example.

DESCRIPTION OF THE PREFERREDEMBODIMENT

Figure 1:
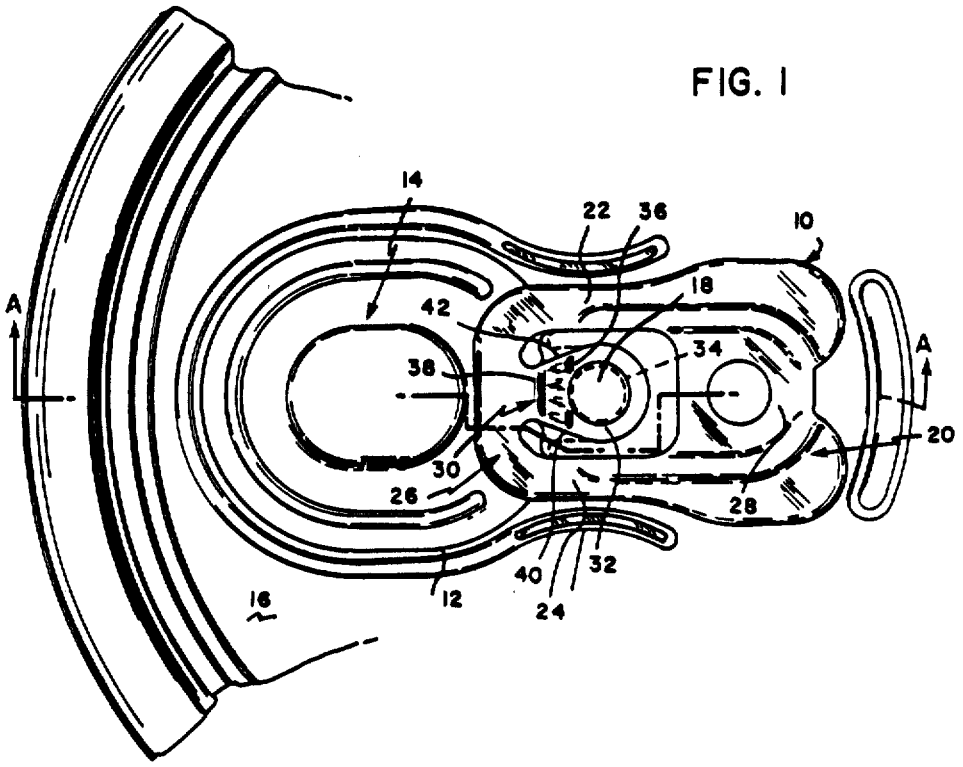
FIG. 1 is a plan view showing a preferred embodiment of the improved tab of the present invention.

In the following detailed description of a preferred embodiment of the invention, the terminology used will be compatible with that used in U.S. Pat. No. 4,030,631 issued June 21, 1977, to Brown, and like parts will be denoted by the same reference numerals.

Referring now to FIG. 1, in which a plan view of the easy-opening end structure of the preferred embodiment is shown, an opening is formed in the container when the tab 10 is used to fracture a scoreline 12 which defines a panel 14 in the end 16 of the container. In U.S. Pat. No. 4,030,631, the panel 14 and the rivet 18 are unitary parts of the end 16, while the tab 10 is a separate part retained to the end 16 by the rivet 18. The structural details of the easy-open end, along with the method of fabricating it and the manner in which it is used are described in the above-referenced U.S. Pat. No. 4,030,631 which is incorporated herein by reference.

The tab 10 includes a lifting end 20, spaced leg members 22, 24, and an opening end 26. The spaced leg members 22, 24 are connected near the lifting end 20 by a web portion 28, which may include an indexing hole. The spaced leg members 22, 24 are formed of single-ply sheet metal and are curled for strength and for safety. The tab thus has a roughly rectangular shape with the lifting end 20 opposite the opening end 26 and with the leg member 22 opposite the leg member 24. A flap portion 30 extends from the opening end 26 longitudinally toward the lifting end 20 between the spaced leg members 22, 24. The flap 30 includes an affixing portion 32 spaced from the opening end 26 and including an aperture 34 through which the rivet 18 passes to retain the tab 10 to the end 16. As will be described more fully below, the flap 30 includes a first bending region 36 extending laterally across the flap 30 adjacent the affixing portion of it and on the side of the aperture 34 nearest the opening end 26. In accordance with the teaching of the present invention, the flap 30 further includes a second bending region 38 adjacent the opening end 26 and likewise extending laterally across the flap 30. in the preferred embodiment, the lateral edges 40, 42 of the flap determine its width at various locations in the longitudinal direction. In accordance with the teaching of the present invention, the width of the flap is varied along the length of the flap to define the first bending region 36 and the second bending region 38. In the preferred embodiment, the width of the flap in the second bending region is less than the width of the flap in the first bending region.

Without departing from the teachings of the present invention, it is possible to define first and second bending regions along the flap by including apertures located along the flap at selected regions. Such apertures reduce the effective width of the flap in the region where they are located, so that bending of the flap can take place more readily there, owing to the reduced stiffness of the flap structure at such regions. Thus, the word "width", as used in the present description, should be understood to comprehend the concept of effective width as discussed above.

Figure 2:
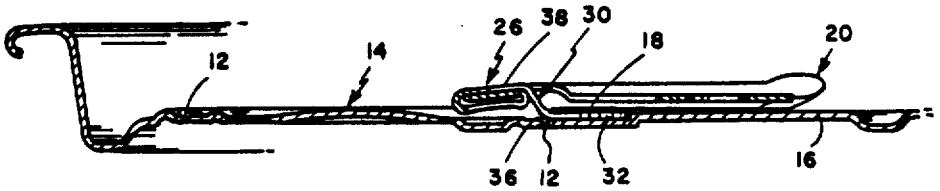
FIG. 2 is a cross-sectional elevation view in the direction A—A of FIG. 1, showing the relationship of the tab of the preferred embodiment to the end of the can while the can is in a sealed condition.

FIG. 2 is a cross-sectional elevation view of the can end in the direction indicated by the broken line A—A of FIG. 1. FIG. 2 shows the relation of the tab 10 to the end 16 when the container is in the sealed condition before it has been opened.

Figure 3:
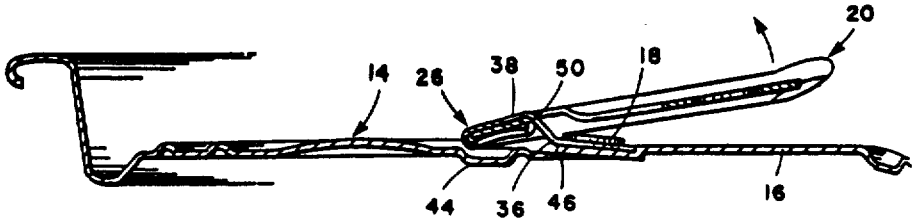
FIG. 3 is a cross-sectional elevation view in the direction A—A of FIG. 1 showing the relationship of the tab to the end of the can immediately after the seal has been "popped;"
Figure 4:
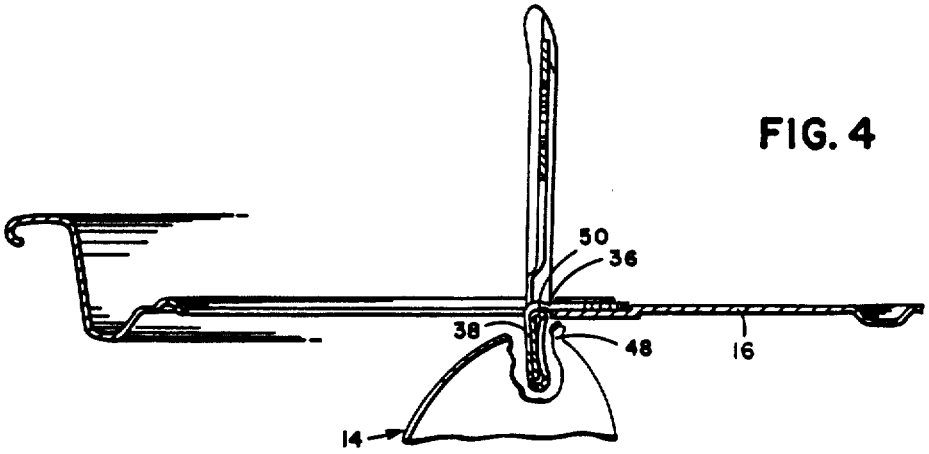
FIG. 4 is a cross-sectional elevation view in the direction A—A of FIG. 1, showing the relationship of the tab to the can end when the lifting end of the tab has been pulled upright to open the can.
Figure 5:
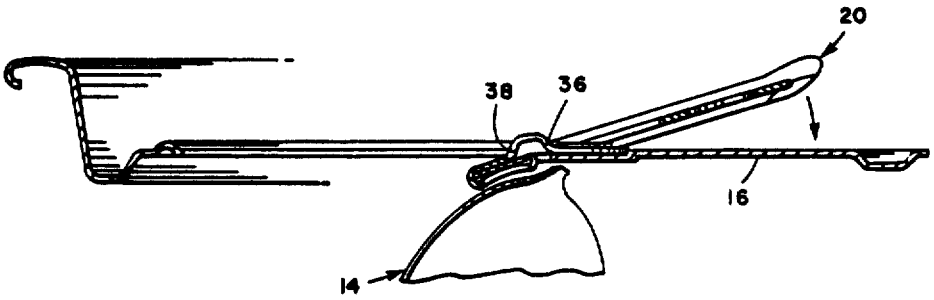
FIG. 5 is a cross-sectional elevation view in the direction A—A of FIG. 1 showing the relationship of the tab to the end of the can after the tab has been pushed toward the can end to prepare the can for use.

FIGS. 3, 4 and 5 are views similar to FIG. 2 showing the interaction of the tab 10 with the end 16 at various stages in the process of opening the container. In FIG. 3, the lifting end 20 as been pulled away from the end 16 as indicated by the arrow. This action brings the opening end 26 of the tab 10 into contact with an underlying portion 44 of the panel 14, which serves as the fulcrum of a class 2 lever, by means of which the rivet 18 and adjoining portion of the end 16 are lifted upwardly, causing a rupture 46 to occur at the score line 12 adjacent the rivet 18. Once the rupture has begun, the panel 14 yields much more readily to the force applied to it by the opening end 26 of the tab, so that the fulcrum of the lever becomes the rivet, and the lever operates as a class 1 lever, the opening end 26 of the tab depressing the panel 14 to the position shown in FIG. 4. FIG. 4 shows the relation of the parts at what is normally the extreme of the lifting motion. The score line defining the panel 14 is not a closed figure in the preferred embodiment, so that when the stage shown in FIG. 4 has been reached, the panel 14 remains attached to the end 16 by means of a small bridge 48, which retains the panel 14 to the end 16 thereby peventing litter and also preventing the panel 14 from falling loosely into the container.

Although an opening has now been formed in the end 16 over the region formerly occupied by the panel 14, it is normal in beverage cans to thereafter push the lifting end 20 of the tab toward the end 16 as shown in FIG. 5, so as to facilitate drinking directly from the container. During this motion, the panel 14 remains in the same position it had in FIG. 4.

The action of the flap 30 during the sequence shown in FIGS. 2-5 is particularly noteworthy. From the initial position shown in FIG. 2, the flap 30 begins to wind around the adjoining portion 50 of the opening end 26, while experiencing a slight downward flexing with some bending occurring at the first bending region 36, as indicated in FIGS. 3 and 4. During those phases of the sequence, almost no flexing occurs in the second bending region 38. During the return motion shown in FIG. 5, notable flexing occurs in the second bending region 38, accompanied by a modest flexing of the first bending region 36 in the upward direction. To the extent that flexing occurs at the second bending region 38, flexing does not have to occur in the first bend-region 36. This illustrates one of the important teachings of the present invention, namely the benefit of distributing the flexing along the length of the flap 30 so as to avoid localized flexing.

It is believed that a cumulative work hardening effect takes place in the bending regions each time they are flexed. In this regard, the present invention teaches the successive use of the first bending region 36 and the second bending region 38 on the successive raising and lowering motions of the lifting end 20 respectively, so that after the first bending region 36 had become embrittled during the lifting motion, further flexing of the first bending 36 is avoided as much as possible, the flexing required during the downward motion of the lifting end 20 takes place at the second bending region 38 which has not become embrittled.

Only two bending regions are used in the preferred embodiment to share the flexing that results from the first and second, raising and lowering, motions of the tab. However, the concept of the invention is broader, comprehending shaping the flap portion of the tab specifically to reduce localized bending of the material. Consistent with this broad concept, various numbers of bending regions can be used in other embodiments to distribute the bending along the flap.

Figure 6:
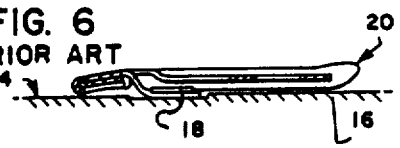
FIG. 6 PRIOR ART
FIGS. 6-11 are cross-sectional elevation views in the direction A—A of FIG. 1 and shown in sequence successive stages in the flexing of the tab of the prior art.
Figure 7:
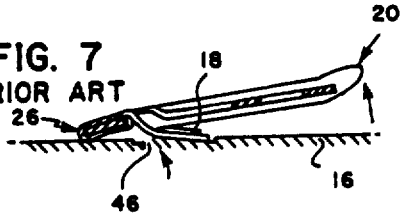
FIG. 7 PRIOR ART
Figure 8:
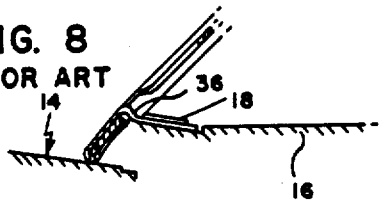
FIG. 8 PRIOR ART
Figure 9:
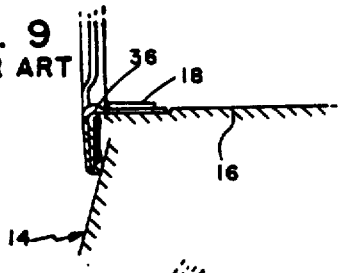
FIG. 9 PRIOR ART
Figure 10:
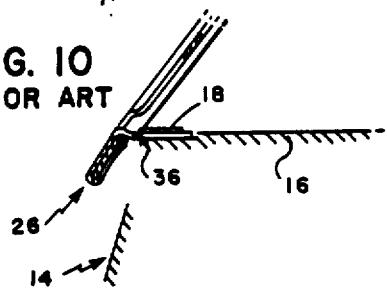
FIG. 10 PRIOR ART
Figure 11:
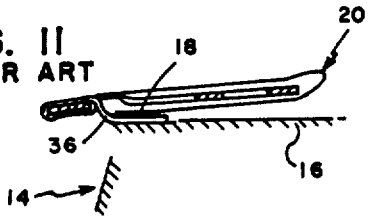
FIG. 11 PRIOR ART
Figure 12:
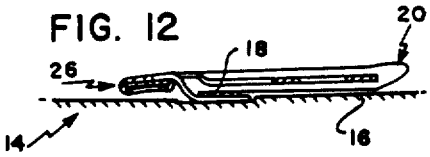
FIGS. 12-17 are a series of cross-sectional elevation views in the direction A—A of FIG. 1 and shown successive stages in the flexing of a tab of the preferred embodiment.
Figure 13:
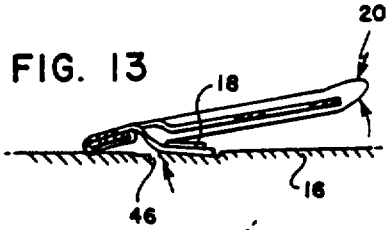
Figure 14:
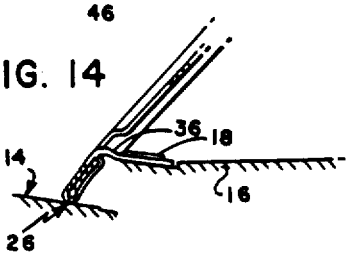
Figure 15:
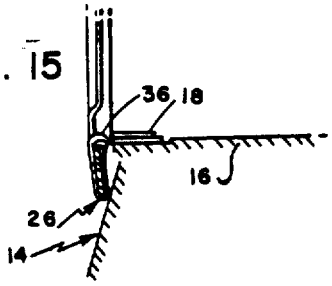

This benefit of the present invention can be seen more clearly in comparison with the prior art. FIGS. 6 through 11 show successive stages of the opening process for an end constructed according to the prior art, while FIGS. 12–17 show the action at corresponding stages for the tab of the present invention. FIGS. 6 and 12 show the initial position in which the container is sealed. In FIGS. 7 and 13, the tab has been lifted, rupturing the score line. In FIGS. 8 and 14, the process is continued with the panel 14 being depressed into the can. FIGS. 9 and 15 shown the relative positions of the parts at the extreme position reached in the lifting motion of the tab. It is noteworthy that to this point in the opening process, the amount of flexing and the location of the flexing are substantially the same for both the prior art tab and the tab of the present invention. In each case some flexing has occurred in the first bending region 36 adjacent the rivet 18. The superior flexing endurance of the tab of the present invention results from its operation during the return motion of the tab shown in FIGS. 10, 11, 16 and 17. As seen in FIGS. 10 and 11, considerable reverse bending occurs in the tab of the prior art at the first bending region 36, which is already embrittled by the flexing that occurred during the initial movement illustrated in FIGS. 6–9. Thus, during the complete container-opening sequence (FIGS. 6–11), the tab of the prior art is flexed twice in the first bending region 36, first in one direction and then in the opposite direction.

Figure 16:
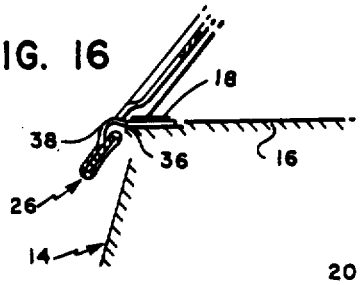
Figure 17:
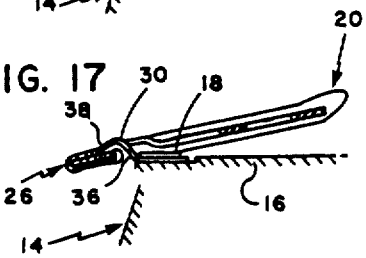

In contrast, when the tab is constructed according to the preferred embodiment of the present invention, the flap 30 is bent only once at the first bending region during the lifting motion illustrated in FIGS. 12–15, with most of the flexing produced by the retun motion of FIGS. 16 and 17 taking place in the second bending region 38, which has not previously been flexed and which therefore is not embrittled. Thus, it is seen that in the preferred embodiment, the flexing is distributed along the length of the flap 30 so as to avoid localized flexing so far as possible. The superior flexural endurance of the tab of the present invention results from its structure which defines more than one bending region so that flexure of the flap is distributed and localized flexing is avoided. The tab of the present invention fills an urgent need in the container industry for a retained-tab end having superior endurance to repeated flexing motions and which can be produced economically with existing equipment.

The foregoing detailed description is illustrative of the preferred embodiment of the invention, but it will be understood that additional embodiments will be obvious to those skilled in the art. The embodiments described herein together with those additional embodiments are considered to be within the scope of the invention.

What is claimed is:

1. A tab of the type affixed to a can end for opening it and comprising:

a unitary structure including a lifting end;

an opening end opposite said lifting end and spaced from it;

spaced leg members connecting said lifting end and said opening end; and, a flap extending longitudinally from said opening end toward said lifting end between said spaced leg members, spaced from said spaced leg members and from said lifing end, including an affixing portion by which said flap is affixed to the can end, said affixing portion spaced from said opening end, the width of said flap varying along the length of said flap to define a first bending region extending laterally across said flap adjacent said affixing portion and a second bending region extending laterally across said flap adjacent said opening end, the width of said flap in said second bending region being sufficiently small relative to the width of said flap in said first bending region that after said lifting end has been pulled away from the can, thereby flexing said flap in said first bending region, when said lifting end is subsequently pushed toward the can end, said flap flexes in said second bending region, whereby no part of said flap is flexed more than once as said lifting end is pulled away from the can and then pushed back towards its original position adjacent the can end.

2. In a unitary tab of the type affixed to a can end for opening it and having a lifting end opposite an opening end, and having spaced leg members connecting the opposite ends, the improvement comprising:

a flap extending from the opening end toward the lifting end between the spaced leg members, spaced from the spaced leg members and from the lifting end, and including an affixing portion by which said flap is affixed to the can end, said affixing portion spaced from the opening end, the width of said flap increasing along the length of said flap between the opening end and said affixing portion so that flexing of said flap is distributed along the length of said flap between the opening end and said affixing portion when the lifting end of the tab is first lifted away from the can end and then pushed back towards it, whereby repeated localized flexing is substantially avoided.

3. The improvement of claim 2 wherein said flap is generally tapered in width between the opening end and said affixing portion.

4. The improvement of claim 2 wherein said flap is sufficiently narrow adjacent the opening end that after the lifting end has been pulled away from the can end thereby bending said flap in a first bending region of it located adjacent said affixing region, when the lifting end is subsequently pushed toward the can end said flap bends in a second bending region of it located adjacent the opening end.

*5. A tab for easy opening containers comprising a tab body having means at one end particularly adapted for applying an inwardly directed rupturing pressure on the container panel when the opposite end is moved outwardly, said tab having a bendable mounting ear positioned intermediate its ends for connection to the end panel, and means providing a plurality of hinge axes on said ear for accommodating shifting the bend of the ear from one axis to another attendant to back and forth bending movements of said tab and thus impeding fracture of the ear and thereby removal of the tab from the container.*

*6. The invention according to claim 1 and said one end of the tab comprising a nose portion having a non-work hardened section and at least one of said hinge axes being located in said section.*

*7. The invention according to claim 2 and said mounting ear having a narrower than elsewhere width portion adjacent to said non-work hardened section.*

*8. The invention according to claim 1 and said ear having side edges with at least one notch in each edge defining at least one of said hinge axes.*

*9. The invention according to claim 5 and said notches each defined by an inner edge and said inner edges converging toward said one end of the tab.*

*10. The invention according to claim 1 and said means comprising a portion at the forward end of the tab each sloping upwardly toward said one end of the ear and adapted to ear during hinging movement between the tab and ear.*

*11. The invention according to claim 1 and said tab being made of thin one piece sheet metal.*

*12. The invention according to claim 1 and said tab being aluminum.*

*13. An easy opening container end with nondetachable means for making an opening therethrough suitable for pouring comprising:*

A tab having work hardened means at one end for rupturing said end and a nonwork hardened section and having a lift portion at the other end for lifting the tab and pressing said one end against said container end, and attaching means on the container end and said tab for securing the tab to said container end and comprising a securing lug on the tab, and at least one selected hinging axis of connection between the said lug and tab in a nonwork hardened section of the tab at said one end.

*14. The invention according to claim 11 and said tab having a central depressed body section and said lug being cut from said body section.*

* * * * *